Oct. 24, 1933.    A. F. STUEBING    1,932,196
THROTTLE VALVE
Filed March 27, 1931
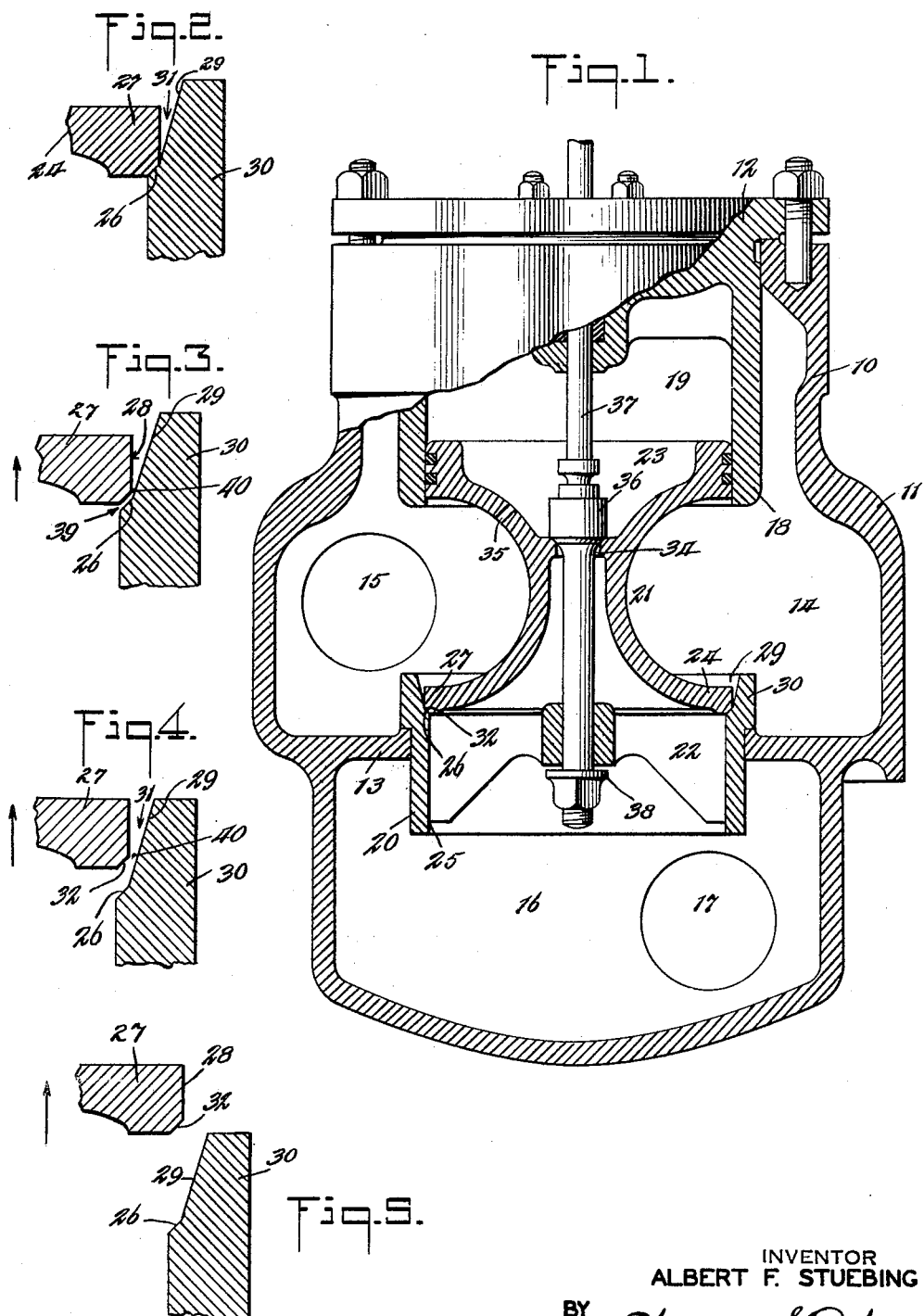
INVENTOR
ALBERT F. STUEBING
BY
Warren S. Orton
ATTORNEY Patented Oct. 24, 1933

1,932,196

UNITED STATES PATENT OFFICE 1,932,196

THROTTLE VALVE

Albert F. Stuebing, Scarsdale, N. Y., assignor, by mesne assignments, to American Throttle Company Inc., New York, N. Y., a corporation of New York Application March 27, 1931. Serial No. 525,725

12 Claims. (Cl. 277—37)

The invention relates in general to a valvular construction of general application wherever it is desired to control a fluid flow particularly where the fluid flow is under high pressure, and the invention particularly relates to a valve and associated seat forming parts in valvular constructions designed to provide an easily manipulated control of steam and other high pressure fluid in its passage through a conduit. In the form of the invention herein selected for illustration it is shown applied to a balanced type of valve construction of the type designed to control high pressure fluid such as the steam supply in a locomotive throttle valve.

The primary object of the invention is to provide a simplified form of valvular construction of the type above outlined which will provide a quiet, uniformly progressive opening movement of the valve under the control of the operator in its opening movement and free of any effect thereon from the fluid passing through the conduit and by the valve, which might tend to interfere with or modify the controlled opening movement of the valve during the initial state of its unseating movement.

In valvular constructions of the throttle valve type, such as disclosed in the accompanying drawing, it is usual to make the area of the piston in the balancing chamber approximately equal to the area of the seat engaging portion of the associated main valve so that normally the seated valve is maintained on its seat by the pressure of the fluid acting on the piston. When it is desired to open the main valve, a pilot or auxiliary valve is first opened to admit of a leakage of the high pressure from the inlet end or balancing chamber to the outlet end of the construction with the result that there is a gradual reducing of the difference in pressure on opposite sides of the main valve resulting in easy movement of the main valve off its seat. As the main valve opens it exposes the underside of its seating surface to the high pressure in the inlet end of the construction with a resulting tendency to lift the valve suddenly still further off its seat. In the constructions now in common use, this rapid lifting of the main valve acts to reduce the auxiliary valve opening even to the extent of cutting it off entirely. As the closing of the leakage opening controlled by the auxiliary valve shuts off the escape of pressure from the balancing chamber there are set up pressure forces tending to move the main valve back towards its seat. As the main valve approaches its seat the forces again become unbalanced in the opposite direction as during the first unseating movement above noted, with a result that there is frequently set up in the main valve rapid and severe vibrations. Attempts have been made heretofore to remedy this condition, usually by constructing the main valve so that it will be under-balanced by an amount greater than the pressure exerted upon the seating surface thereof during the initial opening movement of the valve. This arrangement has not proven satisfactory especially in high pressure operations as a controlling manual force must be utilized in unseating the main valve to compensate for this underbalancing. It is highly desirable in constructions of this character to provide for an easy, manual operation of the control mechanism for opening the auxiliary and main valves.

Accordingly, another object of the invention is to provide for a valve construction of the type outlined, the main valve element of which can be controlled in its opening and closing movements by light manual effort and at the same time to avoid any tendency to set up any vibratory or freely floating movement of the main valve as it is moved off its seat.

Various other objects and advantages of the invention will be in part obvious from an inspection of the accompanying drawing and in part will be more fully set forth in the following particular description of one form of mechanism embodying the invention, and the invention also consists in certain new and novel features of construction and combination of parts hereinafter set forth and claimed.

In the accompanying drawing:

Fig. 1 is a view in axial section through a steam throttle valve of a balanced valve type showing installed therein a preferred embodiment of the invention and showing both the main and auxiliary valves in closed positions;

Figs. 2 to 5 inclusive are detailed, enlarged, marginal sectional views of an edge of the main valve, its seat and adjacent parts constituting portions of the steam conduit shown in Fig. 1; the several figures showing the succeeding positions of the parts as the main valve is moved off its seat.

Referring to Figure 1, there is shown a valvular construction 10 including a main open top shell 11, a cover 12 closing the open top and an internal partition 13 coacting to provide a high pressure inlet chamber 14 with an inlet 15 opening into the same and a pressure outlet chamber 16 with a discharge outlet 17. The cover 12 is provided with an inwardly and axially extending cylindrical wall 18 forming a balancing chamber 19. Disposed in axial alignment with the cylinder wall 18 is a seat ring 20 fitted in an opening in the partition 13 and providing a conduit between the chambers 14 and 16. A spool shaped sliding unit 21 has a lower portion 22 formed of a plurality of axially extending guiding wings slidably mounted axially in the ring 20. At its upper end the unit is formed to constitute a piston 23 slidably mounted in the balancing chamber 19. The portion of the unit just above the wings form a main valve 24.

The bore 25 of the ring 20 is free of obstruction between its ends so as to provide a clear, unobstructed passageway between the inlet and outlet chambers when the main valve is in its open position. This bore has its upper end twice enlarged with the first enlargement providing an annular valve seat 26 of relatively small radial dimension. In the illustrated case, this seat is beveled with an inclination of about 45°, to the axis of the bore, but it is within the scope of the invention and, in some cases it is preferable, to provide the seat as a flat shouldered portion disposed in a plane perpendicular to the axis.

The invention herein particularly features the construction or rather configuration of the conduit formed by the upper portion of the bore 25 above the valve seat, in its relation to the cylindrical portion 27 of the main valve 24. To give the requisite clearance between the periphery 28 of the valve portion 27 and the inner face 29 of the upper end of ring 20 which forms an apron 30 extending above the valve seat, the bore 25 is given its second enlargement to provide the inner peripheral face 29 of apron 30 in a flat frusto-conical form. It has been found that when the area of the opening past the valve becomes approximately equal to one fourth of the area of the passage through the bore 25, the pressures on opposite sides of the main valve become equalized and as no further restriction at the peripheral edge of the valve is required when the valve has reached such point, the upper edge of the apron is terminated at that point as shown in Figure 5. The face 29 has its smaller end merging into the seat 26 with its upper end wide open freely to receive the high pressure fluid from the chamber 14. In the instant case the inclination of the surface 29 is about 15° to the axis of the bore 25. This construction provides a clearance between the apron 30 and the cylindrical peripheral portion 28 of the valve 24 so that the horizontal cross section of clearance 31 gradually increases from the valve seat upwardly towards the high pressure chamber 14. In those cases where the valve seat is beveled the underside of the cylindrical portion 27 of the valve is similarly beveled at its edge to form an annular seat engaging face 32.

The portion of the sliding unit 21 which faces the balancing chamber 19 is provided with a constricted bleeding port 35 which permits the passing slowly of the high pressure fluid from chamber 14 into chamber 19 so that in the normally closed position of the main valve on its seat the pressure in the balancing chamber acting on piston 23 will tend to maintain the valve firmly in its seated position.

Communication past the main valve between the high pressure chamber 14 and the lower pressure chamber 16 is provided through by-passing passageway 34 controlled by an auxiliary valve 36 secured to a stem 37 constituting part of the control mechanism for governing the shifting of the main and auxiliary valves. The stem 37 had a limited movement relative to the main valve and follows conventional structure in that on a lifting movement of the stem 37 valve 36 is first moved into open position after which head 38 at the lower end of the stem engages the sliding unit 21 to lift the same bodily from the position shown in Fig. 1 and thus lift the main valve into open position away from its engagement with the valve seat.

In operation, starting first with the valves in their closed position as indicated in Figs. 1 and 2, a lifting movement on stem 37 lifts auxiliary valve 36 into position to permit passage of fluid in the chamber 14, through the bleeding port 35, into chamber 19 and therefrom through passageway 34 to the chamber 16 on the underside of the seated main valve. As is usual in such construction this will have the tendency to equalize pressures on opposite sides of the main valve. The continued lifting movement of stem 37 will then cause the main valve to be lifted off its seat, the initial stage of such movement indicated in an exaggerated showing in Fig. 3. At this time there will be formed between the valve face 32 and its seat 26 a short and constricted annular passageway 39 with its maximum constriction at its upper end 40 and with a wide open clearance on opposite sides of the passageway 39. It is appreciated that in the instant case steam under high pressure is being forced at high velocity through the constriction at 40. In general, it is appreciated that by blowing a fluid such as steam under high pressure through a constricted vent with sufficient space for expanding beyond, the constriction tends to create in this space a reduced pressure condition. In this respect the present invention distinguishes from similar forms of valves and their associated seats in that no provision has been made heretofore to insure the providing of large volumetric capacity to the steam or fluid in its movement to the valve seat to insure ample and unrestricted supply of pressure at the intake end of the constriction provided between the seat and the valve during the initial stages of its opening movement with a subsequent clearance to permit the expansion of the steam or other ejected pressure fluid beyond the constricted passageway. In the known constructions which did not feature this venturi effect at the valve seat there was permitted as above noted the accumulation of a valve lifting pressure on the underside of the valve which pressure tended to snap the valve upwardly further off its seat with a rebound which gave rise to the objectionable vibration hereinbefore mentioned.

With the construction herein disclosed, the initial opening movement of the main valve results in a flow at extremely high velocity past the seating surface and maintains the pressure at the seating surface so low that there is no appreciable unbalancing of the forces which are acting to move the valve in its seating direction. This tends to maintain the floating valve in engagement with the stem head 38 and thus insures a lifting movement of the valve controlled entirely by the lifting of the valve stem and unaffected by the fluid pressure. Noting the relation of the parts in the showing in Fig. 3, it will be seen that there is provided for the steam or fluid under pressure an unobstructed passageway past the peripheral edge of the main valve, which passageway is formed of an unobstructed clearance at 31 which gradually reduces to the constriction 40, clears through the short passageway 39 and then opens into the large bore 25 which provides a large expansion space. This gradual reducing of clearance in the passageway to its point of maximum constriction at the valve seat with its subsequent enlargement of conducting capacity provides for a venturi effect where the fluid is ejected through a narrow vent and then permitted to expand freely with incidental reduction in its pressure force as it passes through a chamber of large capacity.

As the valve is lifted into its succeeding opening position as indicated in Figs. 4 and 5, it will be noted by reference to Fig. 4 that as the distance between the valve and its seat gradually increases the clearance between the valve and the apron also increases but at a rate more rapid, so that as the valve approaches the position shown in Fig. 5 in its movement above the apron into its fully open position, there will be provided an ample clearance to conduct pressure to the constricted portion between the valve and its seat in all intermediate positions of the valve during the initial stages of its opening movement. This will mean that when the difference in pressure conditions on opposite sides of the valve are at their greatest, that is at the instant when the main valve starts to open, there will be exerted on the underside of the valve the maximum extent of valve seating tendency under the suction effect of the fluid passing the same and with increase in clearance between the valve and its seat this seating tendency will be gradually reduced. When the valve has been moved to about the position shown in Fig. 5, pressure on opposite sides of the valve will be completely balanced and at this point there will be no tendency for the valve to vibrate.

By means of the device herein disclosed, it is possible to provide a valve construction which can be easily operated simply by lifting the valve controlling stem and the main valve will move off its seat with a regular, uniform motion, controlled entirely by the rate of lifting movement of the manually controlled valve stem. The main valve simply moves up off its seat without tendency to move faster than is permitted by the controlling valve stem and without tendency to shut off the by-pass controlled by the auxiliary valve. The construction is therefore free of the objectionable vibration and hammering of the valve back and forth onto its valve seat which has characterized similar known constructions. There has been attained incidentally an improvement in the gradual building up of pressure in the outlet chamber, the elimination of cross or eddy currents in the flow and the elimination of fluid knocking during the opening movement of the valves.

As the invention herein disclosed eliminates the tendency of the main valve to move off its seat when first unseated, it is possible to avoid any necessity of providing an underbalancing form of balancing chamber construction with resulting necessity for abnormal pressure of the valve on its seat and there has thus been avoided other objections to such forms of valvular construction, such as difficulty to unseat the main valve and frictional resistance to the movement of bulky valve parts.

I claim:

1. In a device of the class described, the combination of valvular structural parts forming a balancing chamber and providing a high pressure fluid conduit having a constricted portion intermediate its ends with an annular valve seat outlining said constricted portion, a single shiftable member slidably mounted in said structural parts and including a piston working in said balancing chamber and a main valve for controlling said conduit and adapted to engage said seat to close said conduit, said main valve and piston having substantially the same pressure presenting areas whereby the main valve is urged towards its seat when in engagement therewith by the pressure in the conduit, means providing a pilot valve for by-passing fluid in the conduit past the main valve, control means movable in one direction for successively opening the pilot valve and then opening the main valve and means for resisting any tendency of the main valve to vibrate on its seat during the initial stages of its unseating movement, said means including a frusto-conical portion of the conduit-forming parts, disposed with the smaller end of said portion opening through the valve seat, and providing an annular clearance about the main valve, said clearance being substantially K-shaped in radial cross section, when the valve is slightly removed from its seat, having an intermediate portion of least clearance and gradually increasing in clearance from said portion towards opposite ends and the clearance above said least clearance portion being greater in fluid conducting capacity than the similar capacity of the clearance between the valve and its seat in all positions of the valve during the initial stages of its unseating movement as well as during the time while the seat engaging portion of the valve is within the outlines of its seat.

2. In a device of the class described, the combination of a structure having a balancing chamber and a steam conduit having its bore enlarged slightly to provide an annular conical valve seat, a valve having at one end a cylindrical portion provided on its underside with an annular conical seat-engaging face for engaging said seat to close the conduit and having at its other end a balancing piston working in said balancing chamber, valvular means for placing opposite sides of the valve in fluid intercommunication, said bore being further enlarged beyond the seat to provide a conical annular passageway between the perimeter of the cylindrical portion of the seated valve and this further enlarged portion of the bore, the cross sectional area of said annular passageway gradually increasing from the valve seat to the end of the bore in the direction of unseating movement of the valve thereby presenting a constricted opening between the valve and its seat during the preliminary state of the opening movement of the valve and said opening increasing during the succeeding stages of the unseating movement of the valve.

3. In a device of the class described, the combination of means providing a steam conduit having a point of maximum constriction with a valve seat at this point, a valve for closing said conduit, means for forcing the valve on to its seat including a balancing chamber and a piston working therein and movable with the valve, means for opening said valve against the pressure of its steam head, said valve including a cylindrical portion having a peripheral engagement with said seat to close said conduit and having its side in spaced relation to the wall outlining the part of the conduit surrounding the seat, said valve when slightly unseated at the very beginning of its unseating movement forming a passageway of relatively large clearance between itself and the seat and a relatively small clearance between itself and said outlining wall.

4. In a valvular construction, the combination of a seat ring having a cylindrical bore free of projections and providing a clear unobstructed fluid passageway therethrough from end to end, one end of said bore being twice enlarged, the first enlargement being relatively narrow and providing a valve seat having a relatively narrow diametrical width, and the second enlargement gradually and uniformly increasing in diametrical width from the valve seat towards the adjacent end of the bore, and a cylindrical valve adapted to be contained within the outlines of the seat ring and provided with a face for engaging said seat, movable to and from its seating position axially of the bore enlargement and the portion of the valve above the seat having a diameter substantially equal to the maximum diameter of said seat and coacting with the wall forming the second enlargement to form a clearance substantially V-shaped in radial cross section.

5. In a device of the class described, the combination of means forming a fluid passageway constricted in spaced relation to one end to form a valve seat, a valve for engaging said seat to close the passageway and freely movable towards said end in its unseating movement, said valve when slightly unseated at the very beginning of its unseating movement forming a passageway of relatively large cross sectional area between the same and its seat and said valve coacting with the part of said means outlining the portion of the passageway between the seat and said end to form an annular passageway triangular in radial cross section and of relatively small cross sectional area opening into said passageway of relatively large cross sectional area.

6. In a device of the class described, the combination of a structure providing a high pressure fluid conduit constricted to form an annular valve seat, a valve normally forced onto said seat by the pressure of the fluid, the portion of the conduit on the pressure side of the seat being frusto-conical with its smaller end opening to the valve seat and said valve being movable axially of and being in spaced relation to said frusto-conical portion in all positions of the same thereby to provide for a rapid increase in clearance immediately after the valve opens between the valve and its seat with a relatively less rapid increase in clearance between the valve and said frusto-conical portion of the conduit.

7. In a device of the class described, the combination of a main valve controlling a fluid flow conduit, a stem on which said valve is fitted with capacity for relative movement, a pilot valve fixed to the stem for controlling leakage past the main valve, a conical valve seat on which said main valve is adapted to close, said valve comprising an axially movable cylindrical member with the side facing the seat beveled to form a frusto-conical seat engaging face forming an annular edge with the periphery of the cylindrical portion, a wall outlining the portion of the conduit above the valve seat, said wall being of frusto-conical form with its smaller end merging into the wider end of the conical valve seat, said valve, valve seat and wall coacting for first effecting a slight degree of fluid admission in the preliminary state of unseating the valve, then gradually increasing the degree of fluid admission and thereafter more rapidly increasing the degree of admission throughout the remainder of the unseating travel of the valve.

8. In a device of the class described, the combination of a seat ring having its bore slightly enlarged intermediate its ends to form an annular seat, and the portion of the bore above the seat being further enlarged to form a frusto-conical wall extending from the seat to the upper end of the bore and inclined at an angle of less than forty-five degrees to the axis of the bore, a valve for engaging said annular seat and having a cylindrical part fitting within the smaller end of the frusto-conical wall.

9. In a device of the class described, the combination of means providing a fluid passageway reduced in cross sectional area to form a constricted part, the constricted part forming a valve seat extending substantially at forty-five degrees to the axis of the passageway, a valve for engaging said seat and otherwise at all times in spaced relation to the means forming the passageway, said passageway increasing in cross sectional area from said seat in the direction of unseating movement of the valve and having an angle of the order of fifteen degrees with the axis of movement of the valve.

10. In a device of the class described, the combination of a bore enlarged intermediate its ends to form a valve seat of somewhat flat frusto-conical form extending at an angle of approximately 45° to the axis of the bore and said bore being of somewhat longer frusto-conical form between the valve seat and the adjacent end of the bore, said longer frusto-conical portion extending at an angle of approximately 15° to the axis and a valve having a cylindrical portion adapted to be contained within the long frusto-conical portion and forming a V-shaped clearance between its side and the adjacent side of the bore and said valve provided on its underside with a bevel face adapted to fit on said seat when in closed position.

11. In a device of the class described, the combination of a bore provided intermediate its ends with a shoulder forming a valve seat and said bore being frusto-conical between the seat and the adjacent end of the bore, said frusto-conical portion tapering at an acute angle to the axis of the bore and said seat extending at a relatively greater angle to the axis, a valve provided on its underside with a face fitting said seat, and having a periphery disposed when the valve is engaging the seat in spaced relation to the bore and forming a clearance therebetween increasing in area from the valve seat towards said adjacent end of the bore.

12. In a device of the class described, the combination of means providing a valve seat, a valve for engaging said seat, manually controlled means for balancing pressure on opposite sides of the seated valve, said valve being adapted to be exposed to fluid acting on the valve for closing the same on to its seat, tubular means above the valve seat provided with a frusto-conical bore having its smaller end at the valve seat and having diameters all greater than the diameter of that portion of the valve which is contained in the frusto-conical bore when the valve is in engagement with its seat, said contained portion of the seated valve and the frusto-conical bore coacting to form a V-shaped clearance for the full axial length of the bore.

ALBERT F. STUEBING.